(12) United States Patent
Hoya et al.

(10) Patent No.: US 8,236,131 B2
(45) Date of Patent: Aug. 7, 2012

(54) THERMOPLASTIC RESIN COMPOSITION, MULTILAYER LAMINATE COMPRISING THE SAME, ARTICLE OBTAINED BY ALLOWING THE THERMOPLASTIC RESIN COMPOSITION TO ADHERE THERETO, AND METHOD FOR PROTECTING SURFACE OF ARTICLE

(75) Inventors: Hiroshi Hoya, Chiba (JP); Yoji Hayakawa, Chiba (JP); Koji Matsunaga, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 618 days.

(21) Appl. No.: 12/309,172

(22) PCT Filed: Jul. 2, 2007

(86) PCT No.: PCT/JP2007/063228
§ 371 (c)(1),
(2), (4) Date: Jan. 9, 2009

(87) PCT Pub. No.: WO2008/007575
PCT Pub. Date: Jan. 17, 2008

(65) Prior Publication Data
US 2009/0314429 A1    Dec. 24, 2009

(30) Foreign Application Priority Data
Jul. 13, 2006  (JP) ................. 2006-192638

(51) Int. Cl.
*B32B 27/00*   (2006.01)
*B32B 7/12*    (2006.01)
*B32B 15/04*   (2006.01)
*B01F 17/00*   (2006.01)
*C08L 23/00*   (2006.01)
*C08L 23/04*   (2006.01)

(52) U.S. Cl. ................. 156/334; 428/355 EN; 524/528; 525/240

(58) Field of Classification Search ................. 156/334; 524/528; 525/240; 428/355 EN
See application file for complete search history.

(56) References Cited

U.S. PATENT DOCUMENTS
2004/0158000 A1   8/2004  Yada et al.
(Continued)

FOREIGN PATENT DOCUMENTS
EP    1 741 747 A1    1/2007
(Continued)

OTHER PUBLICATIONS
Extended European Search Report Communication issued Dec. 23, 2009 in Application No. 07768003.1—2109 / 2042553 PCT/JP2007063228.

*Primary Examiner* — Michael Orlando
(74) *Attorney, Agent, or Firm* — Foley & Lardner LLP (57) ABSTRACT

[Problem] To provide a thermoplastic resin composition which is excellent in transparency and adhesion properties and hardly causes staining of an adherend after it is separated, a multilayer laminate using the composition, an article, and a method for protecting a surface of an article.
[Means for solving problem] A thermoplastic resin composition (X) comprising the following components (A) to (C): (A) isotactic polypropylene containing not less than 90% by mol of propylene units, in an amount of 1 to 65% by weight, (B) a propylene copolymer which is a copolymer of propylene and at least one α-olefin of 2 to 20 carbon atoms (excluding propylene) and whose melting point, as measured by DSC, is lower than 65° C. or is not observed, in an amount of 30 to 94% by weight, and (C) a 1-butene-based polymer which is selected from the group consisting of a 1-butene homopolymer and a copolymer of 1-butene and an α-olefin of 2 to 20 carbon atoms (excluding 1-butene) (said copolymer containing not less than 16% by mol of 1-butene units) and whose melting point, as measured by DSC, is in the range of 65 to 135° C., in an amount of 5 to 60% by weight, the total amount of said components (A) to (C) being 100% by weight.

10 Claims, 1 Drawing Sheet

U.S. PATENT DOCUMENTS

| | | |
|---|---|---|
| 2007/0225431 A1 | 9/2007 | Mori et al. |
| 2007/0251572 A1* | 11/2007 | Hoya et al. .................. 136/256 |
| 2009/0258243 A1 | 10/2009 | Maruyama et al. |

FOREIGN PATENT DOCUMENTS

| | | |
|---|---|---|
| EP | 1 947 142 A1 | 7/2008 |
| JP | 9-188789 | 7/1997 |
| JP | 2000-191851 | 7/2000 |
| JP | 2002-317082 | 10/2002 |
| JP | 2003-170554 | 6/2003 |
| JP | 2004-115591 | 4/2004 |
| JP | 2004-338102 | 12/2004 |
| WO | WO 2006/057361 * | 6/2006 |

* cited by examiner

THERMOPLASTIC RESIN COMPOSITION, MULTILAYER LAMINATE COMPRISING THE SAME, ARTICLE OBTAINED BY ALLOWING THE THERMOPLASTIC RESIN COMPOSITION TO ADHERE THERETO, AND METHOD FOR PROTECTING SURFACE OF ARTICLE

TECHNICAL FIELD

The present invention relates to a thermoplastic resin composition which is excellent in transparency and adhesion properties and hardly causes staining of an adherend after it is separated, a multilayer laminate comprising the composition, an article obtained by allowing a thermoplastic resin composition layer to adhere thereto, and a method for protecting a surface of an article.

BACKGROUND ART

In order to protect metal plates, such as aluminum plate, steel plate and stainless steel plate, painted plates of these metal plates, members for processing, such as glass plate and synthetic resin plate, and household appliances, automobile parts or electronic parts using these members, surface protective films having an adhesive layer are allowed to adhere to them.

For example, a surface protective film having an adhesive layer containing a propylene/1-butene/4-methyl-1-pentene copolymer as a main component is described in a patent document 1. Although such a film has good adhesion properties, there is a problem that staining of an adherend occurs (traces of peeling are left).
Patent document 1: Japanese Patent Laid-Open Publication No. 115591/2004

DISCLOSURE OF THE INVENTION

Problem to be Solved by the Invention

It is an object of the present invention to provide a thermoplastic resin composition which is excellent in transparency and adhesion properties and hardly causes staining of an adherend after it is separated, a multilayer laminate using the composition, an article obtained by allowing a thermoplastic resin composition layer to adhere thereto, and a method for protecting a surface of an article.

Means to Solve the Problem

The thermoplastic resin composition (X) of the present invention comprises the following components (A), (B) and (C).

The thermoplastic resin composition (X) comprises the following components (A) to (C):

(A) isotactic polypropylene containing not less than 90% by mol of constituent units derived from propylene, in an amount of 1 to 65% by weight, (B) a propylene copolymer which is a copolymer of propylene and at least one α-olefin of 2 to 20 carbon atoms (excluding propylene) and whose melting point, as measured by a differential scanning calorimeter (DSC), is lower than 65° C. or is not observed, in an amount of 30 to 94% by weight, and (C) a 1-butene-based polymer which is selected from the group consisting of a 1-butene homopolymer and a copolymer of 1-butene and an α-olefin of 2 to 20 carbon atoms (excluding 1-butene) (with the proviso that when the total amount of constituent units derived from 1-butene and constituent units derived from the α-olefin of 2 to 20 carbon atoms (excluding 1-butene) is 100% by mol, the copolymer contains not less than 16% by mol of the constituent units derived from 1-butene) and whose melting point, as measured by a differential scanning calorimeter (DSC), is in the range of 65 to 135° C., in an amount of 5 to 60% by weight, the total amount of said components (A) to (C) being 100% by weight.

When the total amount of constituent units derived from 1-butene and constituent units derived from the α-olefin of 2 to 20 carbon atoms (excluding 1-butene) in the 1-butene/α-olefin copolymer (C) in the thermoplastic resin composition (X) of the invention is 100% by mol, the total amount of constituent units derived from 1-butene and constituent units derived from propylene in the 1-butene/α-olefin copolymer (C) is preferably not less than 80% by mol (though the amount of constituent units derived from propylene may be 0% by mol).

The thermoplastic resin composition (X) of the invention preferably further comprises a tackifying component (D) in an amount of more than 0 part by weight but not more than 100 parts by weight based on 100 parts by weight of the total amount of the components (A) to (C).

The adhesive of the present invention comprises the thermoplastic resin composition (X).

The multilayer laminate of the present invention is a laminate obtained by laminating a layer comprising the thermoplastic resin composition (X) on one surface of a substrate.

The multilayer laminate is preferably a laminate for surface protection.

The article having a composition (X) layer of the present invention is obtained by allowing a layer comprising the thermoplastic resin composition (X) to adhere to at least a part of a surface of an article.

The second article having a composition (X) layer of the present invention is obtained by allowing the layer comprising the thermoplastic resin composition (X) of the above multilayer laminate to adhere to at least a part of a surface of an article.

The method for protecting an article surface of the present invention comprises allowing a layer comprising the thermoplastic resin composition (X) to adhere to at least a part of a surface of an article.

The method for protecting an article surface of the present invention comprises allowing the above multilayer laminate to adhere to at least a part of a surface of an article.

Effect of the Invention

By the use of the thermoplastic resin composition of the invention, a surface protective film which is excellent in transparency, has good adhesion properties (good initial strength, stable peel feeling, that is, prevention of slip stick) and does not stain an adherend (leaves no traces of peeling) can be obtained.

BEST MODE FOR CARRYING OUT THE INVENTION

The present invention is described in detail hereinafter.
Isotactic Polypropylene (A)
The isotactic polypropylene (A) for use in the invention is polypropylene having an isotactic pentad fraction, as measured by NMR method, of not less than 0.9, preferably not less than 0.95. The isotactic pentad fraction (mmmmm) is measured and calculated by the method described in Japanese Patent Laid-Open Publication No. 147135/2003.

The isotactic polypropylene (A) is a propylene homopolymer or a copolymer of propylene and at least one α-olefin of 2 to 20 carbon atoms other than propylene. Examples of the α-olefins of 2 to 20 carbon atoms other than propylene include ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. Of these, ethylene or an α-olefin of 4 to 10 carbon atoms is preferable. These α-olefins may form a random copolymer or a block copolymer together with propylene. In the polypropylene, the constituent units derived from these α-olefins may be contained in amounts of not more than 10% by mol, preferably not more than 8% by mol.

The isotactic polypropylene (A) has a melt flow rate (MFR), as measured at 230° C. under a load of 2.16 kg in accordance with ASTM D 1238, of 0.01 to 1000 g/10 min, preferably 0.05 to 100 g/10 min.

As the isotactic polypropylene (A), homopolypropylene, block polypropylene (publicly known one usually containing 3 to 30% by weight of n-decane elution rubber component), or random polypropylene (polypropylene having a melting point, as measured by DSC, of 110° C. to 150° C., e.g., polypropylene containing an α-olefin of 2 to 20 carbon atoms other than propylene in an amount of more than 0% by mol but not more than 9% by mol, preferably not less than 1% by mol but not more than 7% by mol, based on 100% by mol of the total amount of propylene and the α-olefin of 2 to 20 carbon atoms) can be selected and used in order to obtain desired properties. For attaining the object of the present invention, homopolypropylene having better compatibility with the later-described propylene copolymer (B) is particularly preferably employed.

Such isotactic polypropylene (A) can be prepared by polymerizing propylene or copolymerizing propylene and another α-olefin by the use of a Ziegler catalyst system comprising a solid catalyst component containing magnesium, titanium, halogen and an electron donor as essential components, an organoaluminum compound and an electron donor, or a metallocene catalyst system using a metallocene compound as one component of a catalyst.

Propylene Copolymer (B)

The propylene copolymer (B) for use in the invention is a copolymer of propylene and at least one α-olefin of 2 to 20 carbon atoms other than propylene, and is a copolymer whose melting point, as measured by a differential scanning calorimeter (DSC), is lower than 65° C. or is not observed. When the melting point of the propylene copolymer (B) is in this range, good adhesion properties that are characteristics of the present invention can be obtained, but a propylene copolymer whose melting point is not observed is particularly preferably employable. The expression "melting point is not observed" means that a crystal fusion peak having a quantity of heat of crystal fusion of not less than 1 J/g is not observed in the range of −150 to 200° C. The measuring conditions are as described in the examples. In the case where plural endothermic peaks of DSC are present, the peak temperature of the greatest endothermic peak is regarded as a melting point measured by DSC in the present invention. In the case of the component (B), the top (peak temperature) of the endothermic peak is not present in the temperature range of not lower than 65° C.

The Shore A hardness of the propylene copolymer (B) is not specifically restricted, but for example, a copolymer having a Shore A hardness of 30 to 80, preferably 35 to 70, is desirably employed.

In the propylene copolymer (B) in the invention, the α-olefin that is used as a comonomer is preferably at least one α-olefin selected from the group consisting of ethylene and α-olefins of 4 to 20 carbon atoms.

The propylene copolymer (B) in the invention contains constituent units derived from propylene in amounts of usually 40 to 99% by mol, preferably 45 to 89% by mol, more preferably 56 to 85% by mol, and contains constituent units derived from an α-olefin that is used as a comonomer, in amounts of usually 1 to 60% by mol, preferably 11 to 55% by mol, more preferably 15 to 44% by mol. The total amount of the constituent units derived from propylene and the constituent units derived from the α-olefin of 2 to 20 carbon atoms (excluding propylene) is 100% by mol.

The propylene copolymer (B) in the invention desirably has a melt flow rate (MFR), as measured at 230° C. under a load of 2.16 kg in accordance with ASTM D 1238, of 0.1 to 100 g/10 min, preferably 0.05 to 50 g/10 min.

Although the process for preparing the propylene copolymer (B) in the invention is not specifically restricted, the copolymer can be prepared by polymerizing propylene or copolymerizing propylene and another α-olefin by the use of a publicly known catalyst capable of stereoregularly polymerizing an olefin to form an isotactic or syndiotactic structure, such as a catalyst containing a solid titanium component and an organometallic compound as main components or a mtallocene catalyst using a metallocene compound as one component of the catalyst. Preferably, the copolymer can be obtained by copolymerizing propylene, ethylene and an α-olefin of 4 to 20 carbon atoms in the presence of a metallocene-catalyst, as described later, and for example, a catalyst described in a pamphlet of International Publication No. 087775/2004, e.g., a catalyst described in Examples e1 to e5, is employable.

In the present invention, a catalyst capable of preparing atactic polyolefin is also employable, and such a catalyst is, for example, a metallocene catalyst.

A preferred example of the propylene copolymer (B) in the invention is a copolymer containing constituent units derived from propylene and constituent units derived from an α-olefin of 4 to 20 carbon atoms. In this case, the propylene copolymer (B) is excellent particularly in adhesion properties. Of such copolymers, a copolymer (B-1) of propylene/ethylene/α-olefin of 4 to 20 carbon atoms and a copolymer (B-2) of propylene/α-olefin of 4 to 20 carbon atoms are particularly preferable.

The copolymer (B-1) of propylene/ethylene/α-olefin of 4 to 20 carbon atoms contains constituent units derived from propylene in amounts of usually 45 to 89% by mol, preferably 56 to 85% by mol, more preferably 61 to 83% by mol, constituent units derived from ethylene in amounts of 5 to 25% by mol, preferably 7 to 14% by mol, more preferably 8 to 14% by mol, and constituent units derived from an α-olefin of 4 to 20 carbon atoms in amounts of 6 to 30% by mol, preferably 8 to 30% by mol, more preferably 9 to 25% by mol. The total amount of the constituent units derived from propylene, the constituent units derived from ethylene and the constituent units derived from the α-olefin of 4 to 20 carbon atoms is 100% by mol. As the α-olefin of 4 to 20 carbon atoms, 1-butene is particularly preferable.

The copolymer (B-2) of propylene/α-olefin of 4 to 20 carbon atoms contains constituent units derived from propylene in amounts of usually 40 to 99% by mol, preferably 60 to 99% by mol, more preferably 80 to 99% by mol, still more preferably 90 to 99% by mol, and constituent units derived from an α-olefin of 4 to 20 carbon atoms in amounts of usually 60 to 1% by mol, preferably 40 to 1% by mol, more preferably 20 to 1% by mol, still more preferably 10 to 1% by mol.

The propylene copolymer (B) in the invention is preferably a copolymer having the following properties additionally and independently.

The triad tacticity (mm fraction), as measured by $^{13}$C-NMR, is preferably not less than 85%, more preferably 85 to 97.5%, still more preferably 87 to 97%, particularly preferably 90 to 97%. When the triad tacticity (mm fraction) is in this range, the copolymer is excellent particularly in balance between flexibility and mechanical strength. The mm fraction can be measured by the method described from the 7th line in page 21 to the 6th line in page 26 of a pamphlet of International Publication No. 087775/2004. Particularly in the case of the propylene copolymer (B1), the mm fraction is preferably in this range.

Although the Shore A hardness of the propylene copolymer (B) is not specifically restricted, it is in the range of usually 30 to 80, preferably 35 to 75.

Further, the stress (M100) of the propylene copolymer (B) in the invention at 100% strain, as measured by the use of a JIS No. 3 dumbbell under the conditions of a span of 30 mm, a stress rate of 30 mm/min and a temperature of 23° C. in accordance with JIS K6301, is usually not more than 4 MPa, preferably not more than 3 MPa, still more preferably not more than 2 MPa. When the stress of the propylene copolymer (B) is in this range, the copolymer is excellent in flexibility, transparency and elastomeric properties.

The propylene copolymer (B) in the invention has a crystallinity, as measured by X-ray diffractometry, of usually not more than 20%, preferably 0 to 15%. Further, the propylene copolymer (B) in the invention has a single glass transition temperature, and the glass transition temperature Tg, as measured by a differential scanning calorimeter (DSC), is usually not higher than −10° C., preferably not higher than −15° C. When the glass transition temperature Tg of the propylene copolymer (B) in the invention is in the above range, the copolymer is excellent in low-temperature resistance and low-temperature properties.

When the melting point (Tm, ° C.) is present in the endothermic curve measured by a differential scanning calorimeter (DSC), the quantity of heat of fusion ΔH of the propylene copolymer (B) in the invention is usually not more than 30 J/g, and the C3 content (% by mol) and the quantity of heat of fusion ΔH (J/g) preferably have a relationship represented by the following relational formula:

$$\Delta H < 345 \, \text{Ln}(C3 \, \text{content}(\% \, \text{by mol})) - 1492$$

wherein 76≦C3 content (% by mol)≦90.

The molecular weight distribution (Mw/Mn, in terms of polystyrene, Mw: weight-average molecular weight, Mn: number-average molecular weight) of the propylene copolymer (B) in the invention, as measured by GPC, is preferably not more than 4.0, more preferably not more than 3.0, still more preferably not more than 2.5.

A preferred example of the propylene copolymer (B) in the invention is the aforesaid propylene/ethylene/α-olefin copolymer (B-1).

By the use of such a propylene/ethylene/α-olefin copolymer (B-1), flexibility of the resulting film is improved to enhance adhesion to an adherend, and besides, because the copolymer is highly compatible with the aforesaid isotactic polypropylene (A), excellent transparency develops.

1-Butene-Based Polymer (C)

The 1-butene-based copolymer (C) which is used in the resin composition of the invention and is selected from the group consisting of a 1-butene homopolymer and a copolymer of 1-butene/α-olefin of 2 to 20 carbon atoms (excluding 1-butene) containing not less than 16% by mol of constituent units derived from 1-butene has a density of 860 to 925 kg/m$^3$, preferably 870 kg/m$^3$ to 920 kg/m$^3$, and has a melting point, as measured by a differential scanning calorimeter (DSC), of 65 to 135° C. The total amount of the constituent units derived from 1-butene and the constituent units derived from the α-olefin of 2 to 20 carbon atoms (excluding 1-butene) is 100% by mol.

Particularly in the case of the 1-butene homopolymer, the melting point is in the range of preferably 110 to 130° C., and in the case of the 1-butene/α-olefin copolymer containing not less than 16% by mol of constituent units derived from 1-butene, the melting point is in the range of preferably 65 to 110° C., more preferably 65 to 90° C.

In the case where plural endothermic peaks of DSC are present, the peak temperature of the greatest endothermic peak is regarded as a melting point measured by DSC in the present invention. The component (C) has only to have the greatest endothermic peak in the above range, and an endothermic peak may be present also in other region. It is preferable that the endothermic peak is present in only the range of 65° C. to 135° C. The expression "the greatest endothermic peak" means an endothermic peak whose height from the base line of the peak is greatest.

In the 1-butene/α-olefin copolymer containing not less than 16% by mol of constituent units derived from 1-butene, the amount of the constituent units derived from 1-butene is particularly preferably not less than 22% by mol.

The 1-butene-based copolymer (C) has MFR, as measured at 190° C. under a load of 2.16 kg in accordance with ASTM D 1238, of 0.1 to 100 g/10 min, preferably 0.3 to 50 g/10 min, more preferably 0.5 to 30 g/10 min.

In the present invention, of the polymers selected from the group consisting of (C) the 1-butene homopolymer and the 1-butene/α-olefin copolymers containing not less than 16% by mol of constituent units derived from 1-butene, two or more kinds of polymers different in properties may be used in combination.

As the 1-butene/α-olefin copolymer, a copolymer in which the total amount of the constituent units derived from 1-butene and the constituent units derived from propylene is not less than 80% by mol, preferably not less than 90% by mol, (the amount of the constituent units derived from propylene may be 0% by mol), is preferably used. Examples of the 1-butene/α-olefin copolymers include the following 1-butene/α-olefin copolymer (C-1) and the following copolymer (C-2) containing constituent units derived from propylene and constituent units derived from 1-butene. Of these, the 1-butene/α-olefin copolymer (C-1) is preferably used particularly from the viewpoint of staining properties on an adherend. The total amount of the constituent units derived from 1-butene and the constituent units derived from the α-olefin of 2 to 20 carbon atoms (excluding 1-butene) is 100% by mol.

1-Butene/α-olefin Copolymer (C-1)

The 1-butene/α-olefin copolymer (C-1) that is preferably used as the 1-butene/α-olefin copolymer for use in the invention is a copolymer of 1-butene and an α-olefin of 2 to 20 carbon atoms, preferably 2 to 10 carbon atoms, other than 1-butene. Examples of such α-olefins include ethylene, propylene, 1-hexene, 4-methyl-1-pentene, 1-octene, 1-decene and 1-dodecene. Of these, ethylene and propylene are preferable, and propylene is particularly preferable.

The 1-butene content in the 1-butene/α-olefin copolymer (C-1) is in the range of 60 to 99% by mol, preferably 60 to 95% by mol.

The 1-butene/α-olefin copolymer (C-1) has a melt flow rate (MFR), as measured at 190° C. under a load of 2.16 kg in accordance with ASTM D 1238, of 0.1 to 50 g/10 min, preferably 0.2 to 40 g/10 min, more preferably 0.5 to 25 g/10 min.

Such a 1-butene/α-olefin copolymer (C-1) can be prepared by the use of a Ziegler catalyst or a metallocene catalyst publicly known. Specifically, the copolymer (C-1) can be prepared by a polymerization process using a stereoregular catalyst, said process being described in Japanese Patent Publication No. 7088/1989, Japanese Patent Laid-Open Publication No. 206415/1984, Japanese Patent Laid-Open Publication No. 206416/1984, Japanese Patent Laid-Open Publication No. 218508/1992, Japanese Patent Laid-Open Publication No. 218607/1992, Japanese Patent Laid-Open Publication No. 225605/1996, or the like.

As the copolymer (C-1), a commercially available one may be also employed.

Copolymer (C-2) Containing Constituent Units Derived from Propylene and Constituent Units Derived from 1-butene In the copolymer (C-2) containing constituent units derived from propylene and constituent units derived from 1-butene (also referred to as "copolymer C-2" hereinafter) for use in the invention, the amount of constituent units derived from 1-butene is in the range of, for example, 16 to 40% by mol, preferably 18 to 30% by mol, more preferably 22 to 30% by mol, and the total amount of the constituent units derived from propylene and the constituent units derived from at least one α-olefin that is an arbitrary component and is selected from ethylene and α-olefins of 5 to 20 carbon atoms is, for example, in the range of 60 to 84% by mol, preferably 70 to 82% by mol, more preferably 70 to 78% by mol. The total amount of the constituent units derived from 1-butene, the constituent units derived propylene and the constituent units derived from at least one α-olefin that is an arbitrary component and is selected from ethylene and α-olefins of 5 to 20 carbon atoms is 100% by mol. The amount of the constituent units derived from at least one α-olefin that is an arbitrary component and is selected from ethylene and α-olefins of 5 to 20 carbon atoms is in the range of 0 to 5% by mol based on 100% by mol of the total amount of the constituent units derived from 1-butene, the constituent units derived propylene and the constituent units derived from at least one α-olefin that is an arbitrary component and is selected from ethylene and α-olefins of 5 to 20 carbon atoms, and when the amount thereof is 0% by mol, the copolymer becomes a propylene/1-butene bipolymer, which is one of particularly preferred embodiments. When the constituent units derived from at least one α-olefin selected from ethylene and α-olefins of 5 to 20 carbon atoms are contained, the amount thereof is in the range of preferably 0.1 to 5 by mol, more preferably 0.1 to 4% by mol.

The copolymer (C-2) has a melt flow rate (MFR), as measured at 230° C. under a load of 2.16 kg in accordance with ASTM D 1238, of 0.1 to 50 g/10 min, preferably 2 to 40 g/10 min, more preferably 0.5 to 25 g/10 min.

Although the copolymer (C-2) can be obtained by the use of a publicly known stereoregular catalyst, a copolymer obtained by copolymerization particularly using a metallocene catalyst is desirable. In this case, the molecular weight distribution of the copolymer, as measured by gel permeation chromatography (GPC), is in the range of 1 to 3.

Such a copolymer (C-2) can be obtained by the use of, for example, such a catalyst as described in a pamphlet of International Publication No. WO2004/087775. As such a copolymer (C-2), a copolymer whose melting point Tm (° C.) and comonomer constituent unit content M (% by mol) as determined by $^{13}$C-NMR spectrum measurement satisfy the following formula is preferably employed.

$$146\exp(-0.022M) \geq Tm \geq 125\exp(-0.032M)$$

As the copolymer (C-2), a commercially available one is also employable.

Tackifying Component (D)

The tackifying component (D) that is arbitrarily used in the invention is a resinous substance generally manufactured and sold as a tackifier, and examples thereof include coumarone resins, such as coumarone-indene resin; phenol-based resins, such as phenol-formaldehyde resin and xylene-formaldehyde resin; terpene-based resins, such as terpene-phenol resin, terpene resin (α,β-pinene resin), aromatic modified terpene resin and hydrogenated terpene resin; petroleum type hydrocarbon resins, such as synthetic polyterpene resin, aromatic hydrocarbon resin, aliphatic hydrocarbon resin, aliphatic cyclic hydrocarbon resin, aliphatic alicyclic petroleum resin, aliphatic aromatic petroleum resin, unsaturated hydrocarbon polymer, hydrogenated hydrocarbon resin and hydrocarbon-based tackifying resin; and rosin derivatives, such as pentaerythritol ester of rosin, glycerol ester of rosin, hydrogenated rosin, hydrogenated rosin ester, special rosin ester and rosin-based tackifier.

Of these, hydrogenated resins, such as hydrogenated hydrocarbon resin, hydrogenated aliphatic cyclic hydrocarbon resin, hydrogenated aliphatic alicyclic petroleum resin, hydrogenated terpene resin and hydrogenated synthetic polyterpene resin, pentaerythritol ester of rosin, glycerol ester of rosin and hydrogenated rosin ester, each having a softening point of not lower than 70° C., preferably 70 to 130° C., are preferable because they have good compatibility with the components (A), (B) and (C) in the invention. When the softening point is in the range of 70 to 130° C., tack strength is good, and adhesive strength or cohesive force is great, that is, the balance between tack strength and adhesive strength or cohesive force is excellent.

As the tackifying component, a polystyrene-based elastomer (D) is employable. The polystyrene-based elastomer is, for example, a block copolymer of polystyrene block that becomes a hard part (crystal part) and polymer block of diene-based monomer that becomes a soft part, or a hydrogenated polymer thereof. Specific examples of such block copolymers include a styrene/isoprene/styrene-block copolymer (SIS), a styrene/butadiene/styrene block copolymer (SBS), a hydrogenated styrene/butadiene/styrene block copolymer (HSBS), a styrene/ethylene/butylene/styrene block copolymer (SEBS) and a styrene/ethylene/propylene/styrene block copolymer (SEPS). These copolymers may be used singly or in combination of two or more kinds.

The styrene/ethylene/propylene/styrene block copolymer is a copolymer obtained by hydrogenating a styrene/isoprene/styrene block copolymer.

Examples of the SIS include those on the market under the trade names of JSR SIS (registered trademark, available from JSR Corporation) and Crayton D (registered trademark, available from Shell Chemical Company). An example of the SEPS is that on the market under the trade name of Septon (registered trademark, available from Kuraray Co., Ltd.).

As the tackifying component, an elastomer composed of a polyolefin-based block copolymer is also employable. The elastomer composed of the polyolefin-based block copolymer is, for example, a block copolymer of polyolefin block that becomes a hard part and forms a highly crystalline polymer such as polypropylene and non-crystalline copolymer block of monomer that becomes a soft part. Specific examples of such copolymers include an olefin (crystalline)/ethylene/butylene/olefin (crystalline) block copolymer, a polypropylene/polyethylene oxide/polypropylene block copolymer and a polypropylene/polyolefin (non-crystalline)/polypropylene block copolymer. An example of such a block copolymer is that on the market under the trade name of DYNARON (available from JSR Corporation).

Of the above substances, rosin derivative, terpene-based resin, petroleum resin and hydrogenated petroleum resin are particularly preferable.

In the present invention, the content of the tackifying component (D) is usually more than 0 part by weight but not more than 100 parts by weight, preferably 3 to 30 parts by weight, based on 100 parts by weight of the total amount of the components (A) to (C).

Thermoplastic Resin Composition (X) and Multilayer Laminate Using the Same

The thermoplastic resin composition (X) of the invention comprises the isotactic polypropylene (A), the propylene polymer (B) and the 1-butene-based polymer (C).

The thermoplastic resin composition (X) of the invention may contain the tackifying component (D), and may further contain the later-described inorganic filler and additives when necessary.

The content of the isotactic polypropylene (A) in the thermoplastic resin composition (X) of the invention is in the range of 1 to 65% by weight, preferably 5 to 50% by weight, more preferably 10 to 45% by weight, based on 100% by weight of the total amount of the components (A) to (C).

The content of the propylene polymer (B) in the thermoplastic resin composition (X) of the invention is in the range of 30 to 94% by weight, preferably 40 to 90% by weight, more preferably 50 to 85% by weight, based on 100% by weight of the total amount of the components (A) to (C).

The content of the 1-butene-based polymer (C) in the thermoplastic resin composition (X) of the invention is in the range of 5 to 60% by weight, preferably 5 to 55% by weight, more preferably 5 to 40% by weight, based on 100% by weight of the total amount of the components (A) to (C).

In the thermoplastic resin composition (X) of the invention, the tackifying component (D) can be further contained in an amount of 0.1 to 40 parts by weight, preferably 1 to 30 parts by weight, more preferably 1 to 20 parts by weight, based on 100 parts by weight of the total amount of the components (A) to (C).

When the amounts of the isotactic polypropylene (A) and the propylene polymer (B) are in the above ranges, the thermoplastic resin composition (X) is enhanced in balance among flexibility, adhesive strength and transparency.

The 1-butene-based polymer (C) in the invention that is selected from a 1-butene homopolymer and a 1-butene/α-olefin copolymer containing not less than 16% by mol of constituent units derived from 1-butene is added in order to improve staining of an adherend with the thermoplastic resin composition. The main cause of staining of an adherend is considered to be a constituent (molecule) which has high motility in the propylene polymer (B) and is liable to bleed onto the surface, and it is thought that if (C) the 1-butene homopolymer or the 1-butene/α-olefin copolymer containing not less than 16% by mol of constituent units derived from 1-butene is added, this component (C) selectively incorporates such constituents to exert an effect of preventing bleeding of the constituents onto the surface.

From the knowledge of the prior art, it has been confirmed that increase of the content of the isotactic polypropylene (A) can improve staining properties on adherend even in the case where only two components of the isotactic polypropylene (A) and the propylene polymer (B) are used. In this case, however, great reduction of adhesive strength is a problem. In contrast therewith, by setting the amount of (C) the 1-butene homopolymer or the 1-butene/α-olefin copolymer containing not less than 16% by mol of constituent units derived from 1-butene in the above range, a multilayer laminate highly balanced between the staining properties on adherend and the adhesive strength can be obtained.

To the thermoplastic resin composition (X) of the invention, other resins, other rubbers, inorganic fillers, additives, etc. may be added within limits not detrimental to the object of the present invention, when necessary.

Examples of the inorganic fillers used in the invention include talc, clay, calcium carbonate, mica, silicates, carbonates and glass fiber. Of these, talc and calcium carbonate are preferable, and talc is particularly preferable. As the talc, that having a mean particle diameter of 1 to 5 μm, preferably 1 to 3 μm, is desirable. The inorganic fillers can be used singly or can be used in combination of two or more kinds.

Further, publicly known additives, such as weathering stabilizer, heat stabilizer, antistatic agent, anti-slip agent, anti-blocking agent, anti-fogging agent, lubricant, pigment, dye, plasticizer, anti-aging agent, hydrochloric acid absorbent, antioxidant, crystal nucleating agent, mildew proofing agent and rust proofing agent, can be added within limits not detrimental to the object of the present invention.

The adhesive of the invention comprises the thermoplastic resin composition (X).

The multilayer laminate of the invention comprises a layer (adhesive layer) composed of the thermoplastic resin composition (X) and a substrate. The multilayer laminate of the invention is preferably a laminate obtained by laminating a layer (adhesive layer) composed of the thermoplastic resin composition (X) on at least one surface of a substrate. Specifically, the multilayer laminate of the invention is a laminate obtained by laminating the thermoplastic resin composition (X) layer on one surface or both surfaces of a substrate.

In the multilayer laminate, the layer composed of the thermoplastic resin composition (X) is preferably a surface layer from the viewpoint that the adhesion properties of the (X) layer are utilized.

A preferred example of the multilayer laminate of the invention is a multilayer film.

Although the substrate in the multilayer laminate is not specifically restricted, a layer of a thermoplastic resin is preferable, and examples of such resins include polypropylene-based resins (homopolymer of propylene, and random or block copolymer of propylene and a small amount of an α-olefin), polyethylene-based resins (low-density polyethylene, medium-density polyethylene, high-density polyethylene and linear low-density polyethylene), ethylene-based polymers (ethylene/α-olefin copolymer, ethylene/ethyl acrylate copolymer, ethylene/vinyl acetate copolymer, ethylene/methyl methacrylate copolymer, ethylene/n-butyl acrylate copolymer), poly-4-methyl-pentene-1, and combinations thereof. The substrate may have a single-layer structure or a multilayer structure.

From the viewpoint that good adhesive strength between the surface layer and the substrate can be obtained, it is preferable to use a polyolefin-based resin having good compatibility with the thermoplastic resin composition (X) of the invention for a layer of the multilayer substrate that is brought into direct contact with the surface layer.

The surface of the substrate may have been subjected to known surface treatments, such as corona discharge treatment, plasma treatment, flame treatment, electron ray irradiation treatment and ultraviolet ray irradiation treatment. The substrate may be a colorless transparent layer, or may be a colored or printed layer.

As the substrate material, a monoaxially or biaxially stretched one is also employable.

The multilayer laminate of the invention, such as a multilayer film, can be obtained by a usual multilayer film molding method, but preferred examples of methods to obtain the multilayer laminate include a method wherein a layer of the thermoplastic resin composition (X) and the substrate are co-extruded by T-die film molding or inflation film molding, and a method wherein a layer of the thermoplastic resin composition (X) of the invention is formed on the previously formed substrate by extrusion coating.

The multilayer laminate of the invention may have been stretched monoaxially or biaxially. An example of a preferred monoaxial stretching method is a roll stretching method usually used. Examples of the biaxial stretching methods include a sequential stretching method wherein biaxial stretching is carried out after monoaxial stretching, and a simultaneous stretching method such as a tubular stretching method.

The thickness of the multilayer laminate of the invention, such as a multilayer film, is not specifically restricted, but the thickness thereof is in the range of about 5 to 5000 μm, more preferably about 10 to 1000 μm.

The thickness of the thermoplastic resin composition (X) layer (preferably surface layer) is not specifically restricted and can be selected according to the type of the adherend and the properties required (e.g., adhesive strength), but the thickness based on one layer is in the range of usually 1 to 1000 μm, preferably 3 to 500 μm.

The multilayer laminate of the invention is preferably used for protecting a surface of an article.

When the multilayer laminate of the invention is used for surface protection, a release paper or a release film may be interposed between the multilayer laminate and the multilayer laminate or a release agent may be applied onto the back surface of the substrate, in order to prevent blocking (sticking) of the multilayer laminates of the invention to each other.

In order to impart a function such as slipperiness to the substrate surface when necessary, the thermoplastic resin for the substrate may be used in combination with additives such as a release agent.

By allowing the thermoplastic resin composition (X) layer of the multilayer laminate of the invention to adhere to at least a part of a surface of an article, an article having a composition (X) layer can be formed, and the surface of the article can be protected.

The article is not specifically restricted, but for example, there can be mentioned (1) a metal plate, (2) a painted metal plate, (3) a member for processing, and (4) a product or a part obtained by using the metal plate, the painted metal plate or the member for processing.

Examples of (1) the metal plates include an aluminum plate, a steel plate and a stainless steel plate.

Examples of (3) the members for processing include a glass plate and a synthetic resin plate.

Examples of (4) the products and the parts include household appliances, automobile parts and electronic parts.

The multilayer laminate of the invention is favorably used as a surface protective film for protecting metal plates, such as an aluminum plate, a steel plate and a stainless steel plate, painted plates thereof, members for processing, such as a glass plate and a synthetic resin plate, and household appliances, automobile parts and electronic parts using these members.

Examples of uses of the surface protective films to which the multilayer laminates of the invention are applicable include uses in the field of electronics, such as a lens protective film, a backgrind tape for semiconductor wafer, a dicing tape and a protective tape for printed board, films for window glass protection, and films for baking finish.

When the multilayer laminate of the invention has layers of the thermoplastic resin (X) on both surfaces of the substrate, both of the thermoplastic resin (X) layers may be allowed to adhere to article surface. In this case, these thermoplastic resin (X) layers may be allowed to adhere to different parts of the same article, or may be allowed to adhere to surfaces belonging to different articles.

Further, one thermoplastic resin (X) layer may be allowed to adhere to surfaces of plural articles. When the laminate of the invention has the thermoplastic resin (X) layers on both surfaces of the substrate, each of these layers may be allowed to adhere to surfaces of plural articles.

By allowing the layer composed of the thermoplastic resin composition (X) of the invention to adhere to at least a part of a surface of an article, an article having a composition (X) layer can be formed, and the surface of the article can be protected. In the case where the multilayer laminate of the invention is used for protecting a surface of an article, examples of the articles include the aforesaid articles (1) to (4).

When the thermoplastic resin composition (X) layer is allowed to adhere to an article in the invention, both surfaces of the composition (X) layer may be allowed to adhere to article surface. In this case, each of the surfaces of the composition (X) layer may be allowed to adhere to different parts of the same article, or may be allowed to adhere to surfaces belonging to different articles. For example, to both surfaces of the single layer of the (X) layer having no substrate, surfaces of articles may be allowed to adhere. Further, one surface of the composition (X) layer may be allowed to adhere to surfaces of plural articles. As a matter of course, each surface of the composition (X) layer may be allowed to adhere to surfaces of plural articles.

EXAMPLES

The present invention is further described with reference to the following examples, but it should be construed that the invention is in no way limited to those examples.

Example 1

Evaluation Items

1. Staining Properties on Adherend

An adhesive layer of an adhesive film sample prepared by the process described in the example was applied to a black tile (available from INAX Corporation, trade name: INTERIOR TILE INAX, product number: SPKC-100, color number: L06-J, shape: 100 squares) by the use of a rubber roller at room temperature to prepare a test sample. This test sample was placed in a constant temperature chamber at 40° C. and aged for 1 week and for 2 weeks. Then, from the test sample, the adhesive film sample was peeled, and whether transfer of the adhesive film sample onto the tile surface had occurred or not was visually observed and evaluated.

2. Adhesion Properties

An adhesive film sample prepared by the process described in the example was cut to a size of 100 mm (MD direction)×15 mm (TD direction), and this sample was applied to a black tile in the same manner as above (at room temperature) to prepare a peel test sample. The peel test sample was aged in a constant temperature chamber at 40° C. for 1 week, and thereafter, peel strength (180°, 200 mm/min) was measured. Further, occurrence of slip stick (phenomenon that peel strength greatly varies during peeling) was evaluated by analysis of a peel strength chart.

3. Transparency

Using a haze meter (NDH-300A, manufactured by Nippon Denshoku Industries Co., Ltd.), haze of one fusion-bonding film was measured in accordance with JIS K 7105.

Raw Materials Used in the Examples of the Invention and the Comparative Examples Propylene-Based Polymer (A)
(A-1) Isotactic Homopolypropylene (hPP)
  propylene homopolymer, Tm: 161° C., MFR (230° C.): 7.0 g/10 min, mmmm: 98%, Mw/Mn: 4.3
(A-2) Isotactic Random Polypropylene (rPP)
  propylene content: 95.8% by mol, ethylene content: 3.3% by mol, 1-butene content: 1.5% by mol, Tm: 140° C., MFR (230° C.): 7.0 g/10 min, mmmm: 98%, Mw/Mn: 4.8
Propylene Copolymer (B)
(B) Propylene/Butene/Ethylene Random Copolymer (PBER)
  ethylene content: 14.0% by mol, 1-butene content: 20% by mol, MFR (230° C.): 8.5 g/10 min, melting point: not observed, molecular weight distribution (Mw/Mn): 2.0, Shore A hardness: 38, mm value: 90%

The propylene/ethylene/1-butene copolymer for use in the invention was obtained by the following process.

In a 2000 ml polymerization apparatus thoroughly purged with nitrogen, 917 ml of dry hexane, 90 g of 1-butene and triisobutylaluminum (1.0 mml) were placed at ordinary temperature, then the internal temperature in the polymerization apparatus was raised to 65° C., and the system was pressurized with propylene so that the pressure in the system would become 0.77 MPa. Thereafter, the pressure in the system was adjusted to 0.79 MPa by the use of ethylene. Subsequently, dimethylmethylene(3-tert-butyl-5-methylcyclopentadienyl)fluorenylzirconium dichloride and a toluene solution of methylaluminoxane (available from Tosoh Finechem Corporation) were mixed to prepare a toluene solution containing aluminum atom and zirconium atom in a molar ratio of 300/1 (aluminum atom/zirconium atom). Then, from the toluene solution, the solution of such an amount that 0.002 mmol of zirconium atom would be contained (that is, 0.6 mmol of aluminum atom would be contained) was withdrawn and introduced into the polymerizer, and with maintaining the internal temperature at 65° C. and the internal pressure at 0.79 MPa with ethylene, polymerization was carried out for 20 minutes. Then, 20 ml of methanol was added to terminate polymerization. After the pressure was released, a polymer was precipitated from the polymer solution in 2 liters of methanol, and the polymer was dried at 130° C. for 12 hours under vacuum. The amount of the polymer obtained was 60.4 g.

(C) Butene-Based Polymer
(C-1) Homopolybutene (PB)
  MFR (190° C.): 1.6 g/10 min, melting point: 123° C.
(C-2) Butene/Propylene Random Copolymer (BPR)
  propylene content: 24.0% by mol, 1-butene content: 76.0% by mol, MFR (190° C.): 3.9 g/10 min, melting point: 75° C.
(C-3) Propylene/Butene Random Copolymer (PBR)
  propylene content: 76.0% by mol, 1-butene content: 24.0% by mol, MFR (230° C.): 7.1 g/10 min, melting point: 75° C., molecular weight distribution (Mw/Mn): 2.1
(C-4) 1-Butene/α-olefin Copolymer
  Propylene/1-Butene Random Copolymer (PBR)
  Adsyl of Basell Polyolefins Company (brand name: 7384XCP, MFR (230° C.): 6.0 g/10 min, 1-butene content: 10% by mol, Shore A hardness: not more than 96, melting point measured by DSC method: 126° C. (*1))
  *1: the greatest endothermic peak
(D) Petroleum Resin (P-125, Available from Arakawa Chemical Industries, Ltd.)
  (L) Propylene/1-butene/4-methyl-1-pentene copolymer (PB(4-MP))
  propylene content: 43% by mol, 1-butene content: 26% by mol, 4-methyl-1-pentene content: 31% by mol
(M) Non-Crystalline PP
  Tafcelene available from Sumitomo Chemical Co., Ltd. (T3512, Tm: 158° C., MFR (230° C.): 3.0 g/10 min, Shore A hardness: 61)
(N) Ethylene-Based Elastomer (EBR)
  Ethylene/1-butene random copolymer (density: 870 kg/m$^3$, melting point: 68° C., MFR (190° C.): 3.6 g/10 min, Mw/Mn: 2.1, Shore A hardness: 71)

Method for measuring properties of the above raw materials (1) Melting Point, Endotherm An exothermic/endothermic curve of DSC was determined, and the temperature at the maximum fusion peak position in the elevation of temperature was regarded as Tm. The measurement was carried out by filling the sample in an aluminum pan, then (1) heating the sample up to 200° C. at 100° C./min, maintaining the sample at 200° C. for 5 minutes, thereafter (ii) cooling the sample down to −150° C. at 20° C./min, and then (iii) heating the sample up to 200° C. at 20° C./min. The temperature of the endothermic peak observed in (iii) is a melting point Tm.

Figure 1:
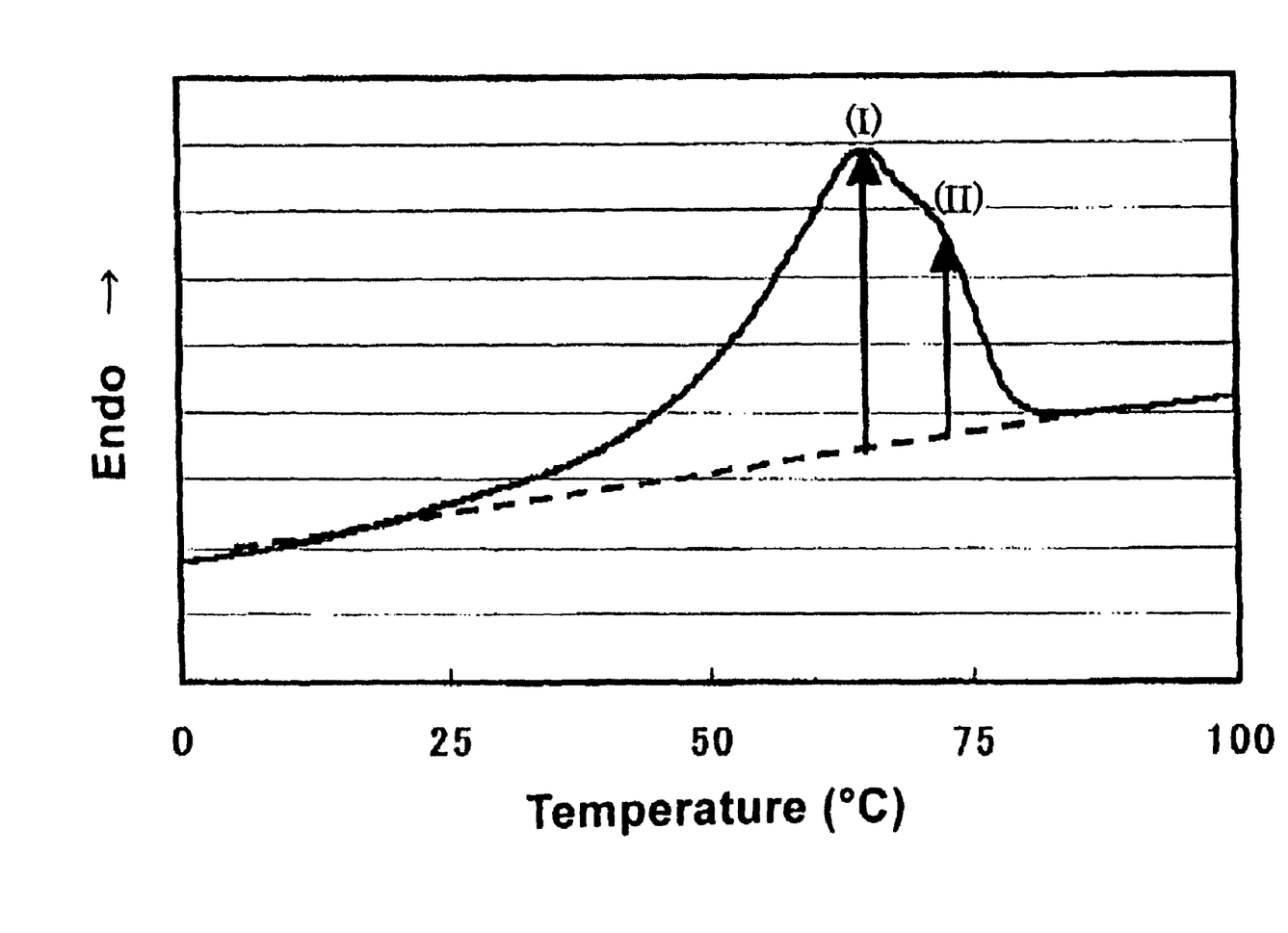
FIG. 1 is a FIGURE showing a method for determining a melting point (Tm) from a DSC curve of a propylene/butene random copolymer (PBR).

In FIG. 1, a DSC curve of (C-3) the propylene/butene random copolymer (PBR) is shown as one example. In this DSC curve, the flat part showing no endothermic behavior is extended with a broken line (base line), and the region surrounded by the DSC curve and the broken line is an endothermic region. From this broken line, a straight line (arrow in FIG. 1) perpendicular to the abscissa is drawn to the top of the peak, and the temperature at which this straight line becomes longest is regarded as a melting point (Tm). In the case of, for example, FIG. 1, there are two peaks, but the straight line of the peak (I) is longer than the straight line of the peak (II), and therefore, the temperature at the peak (I) is selected as a melting point.

(2) Comonomer (ethylene, 1-butene) Content and Stereoregularity (mm)

Comonomer content and stereoregularity were determined by analysis of a $^{13}$C-NMR spectrum.

(3) MFR

MFR was measured at 190° C. or 230° C. under a load of 2.16 kg in accordance with ASTM D-1238.

(4) Molecular Weight Distribution (Mw/Mn)

Using GPC (gel permeation chromatography) and using an o-dichlorobenzene solvent (mobile phase), molecular weight distribution Mw/Mn (in terms of polystyrene, Mw: weight-average molecular weight, Mn: number-average molecular weight) was measured at a column temperature of 140° C. Specifically, molecular weight distribution (Mw/Mn) was measured in the following manner using a gel permeation chromatograph Alliance GPC-2000 model manufactured by Waters Corporation. As separating columns, two TSKgel GNH6-HT and two TSKgel GNH6-HTL were used. Each column had a size of a diameter of 7.5 mm and a length of 300 mm, and the column temperature was 140° C. As the mobile phase, o-dichlorobenzene (available from Wako Pure Chemical Industries, Ltd.) was used, and as an antioxidant, 0.025% by weight of BHT (available from Takeda Pharmaceutical Co., Ltd.) was used. The mobile phase was moved at 1.0 ml/min. The sample concentration was 15 mg/10 ml, and the sample pour was 500 µl. As a detector, a differential refractometer was used. As standard polystyrene having a molecular weight of Mw<1000 and standard polystyrene having a molecular weight of Mw>4×10$^6$, products of Tosoh Corporation were used, and as standard polystyrene having a molecular weight of 1000≦Mw≦4×10$^6$, a product of Pressure Chemical Company was used.

(5) Density

Density was measured in accordance with the method described in ASTM D1505.

(6) Shore A Hardness

A sheet sample having a thickness of 2 mm was allowed to stand at room temperature for 48 hours. Then, using an A type measuring machine, an indenter point was brought into contact with the sample, and the scale was read out immediately (ASTM D-2240).

Examples 1 to 6

Using a blend obtained by dry-blending pellets of raw materials shown in Table 1 in a compositional ratio shown in Table 1, an adhesive film sample (adhesive layer//substrate=20//30 (µm)) was prepared by the use of two extruders of a 3-kind 3-layer type T-die molding machine having a width of 300 mm and equipped with extruders of 50 mm diameter (extrusion temperature: 230° C.). The sample was evaluated on staining properties on adherend, adhesion properties and transparency by the aforesaid methods.

For the substrate, (A-1) isotactic homopolypropylene (hPP) was used.

Comparative Examples 1 to 6

An adhesive film sample was prepared in the same manner as in the examples, except that a blend obtained by dry-blending pellets of raw materials shown in Table 2 in a compositional ratio shown in Table 2 was used (extrusion temperature: 230° C.). The sample was evaluated on staining properties on adherend, adhesion properties and transparency by the aforesaid methods.

TABLE 1

|  |  |  | Ex. 1 | Ex. 2 | Ex. 3 | Ex. 4 | Ex. 5 | Ex. 6 |
|---|---|---|---|---|---|---|---|---|
| (A-1) | hPP | wt % | 20 | 20 | 20 | 20 |  |  |
| (A-2) | rPP |  |  |  |  |  | 20 | 20 |
| (B) | PBER |  | 60 | 60 | 60 | 60 | 60 | 60 |
| (C-1) | PB |  | 20 |  |  |  | 20 |  |
| (C-2) | BPR |  |  | 20 |  | 20 |  | 20 |
| (C-3) | PBR |  |  |  | 20 |  |  |  |
| (D) | Petroleum resin | part(s) |  |  |  | 5 |  |  |
| Staining properties on adherend |  | 1 week | none | none | none | none | none | none |
|  |  | 2 weeks | none | none | none | none | none | none |
| Peel strength |  | g/15 mm | 40 | 60 | 45 | 180 | 45 | 75 |
| Slip stick |  | observed or not | none | none | none | none | none | none |
| Haze |  | % | 2.1 | 2.0 | 1.8 | 1.9 | 1.9 | 1.8 |

TABLE 2

|  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| (A-1) | hPP | wt % |  |  |  | 20 |  | 20 |
| (A-2) | RPP |  | 20 | 40 |  |  | 20 |  |
| (B) | PBER |  | 80 | 60 |  |  | 60 |  |
| (L) | PB(4-MP) |  |  |  |  | 80 |  |  |
| (M) | (M) Non-crystalline PP |  |  |  | 100 |  |  | 60 |
| (N) | EBR |  |  |  |  |  | 20 | 20 |
| Staining properties on adherend |  | 1 week | slightly observed | slightly observed | slightly observed | observed | observed | observed |
|  |  | 2 weeks | observed | observed | observed | observed | observed | observed |
| Peel strength |  | g/15 mm | 250 | 35 | 270 | 115 | 160 | 55 |
| Slip stick |  | observed or not | observed | none | none | observed | observed | none | none |
| Haze |  | % | 1.9 | 2.0 | 2.1 | 3.1 | 2.3 | 2.2 |

From the results shown in Table 1 and Table 2, it has been found that by the use of the thermoplastic resin composition of the invention, staining of an adherend can be prevented and a multilayer-film having good adhesion properties (adhesive strength, prevention of slip stick) can be obtained.

Comparative Example 7

Using a blend obtained by dry-blending pellets of raw materials shown in Table 3 in a compositional ratio shown in Table 3, an adhesive film sample (adhesive layer//substrate=20//30 (µm)) was prepared by the use of two extruders of a 3-kind 3-layer type T-die molding machine having a width of 300 mm and equipped with extruders of 50 mm diameter (extrusion temperature: 230° C.). The sample was evaluated on staining properties on adherend and adhesive strength by the aforesaid methods.

In the case where the propylene/1-butene random copolymer (PBR, C-4) was used instead of the homopolybutene (PB) that was used in the examples of the invention, staining of an adherend occurred. Therefore, the PBR has proved to be unsuitable for an adhesive film.

From the results shown in Table 1, Table 2 and Table 3, it has been found that by the use of the thermoplastic resin composition of the invention, staining of an adherend can be prevented and a multilayer film having good adhesion properties (adhesive strength, prevention of slip stick) can be obtained.

TABLE 3

|  |  |  | Comp. Ex. 7 |
|---|---|---|---|
| (A-1) | HPP | wt % | 20 |
| (B) | PBER |  | 60 |
| (C-1) | PB |  |  |
| (C-4) | PBR |  | 20 |
| Staining properties on adherend |  | 1 week | observed |
|  |  | 2 weeks | observed |
| Peel strength |  | g/15 mm | 75 |
| Slip stick |  | observed or not | observed |

INDUSTRIAL APPLICABILITY

By the use of the thermoplastic resin composition of the invention, it becomes possible to obtain a surface protective film which is excellent in transparency, has good adhesion properties (good initial strength, stable peel feeling, that is, prevention of slip stick) and does not stain an adherend (leaves no traces of peeling).

The multilayer laminate using the thermoplastic resin composition of the invention can be favorably used as an adhesive film (protective film) for protecting various products and materials, such as building materials, industrial materials, electronic materials and optical materials.

The invention claimed is:

1. A thermoplastic resin composition (X) comprising the following components (A) to (C):
    (A) isotactic polypropylene containing not less than 90% by mol of constituent units derived from propylene, in an amount of 1 to 65% by weight,
    (B) a propylene copolymer which is a copolymer of propylene and at least one α-olefin of 2 to 20 carbon atoms excluding propylene and whose melting point, as measured by a differential scanning calorimeter (DSC), is lower than 65° C. or is not observed, wherein the propylene copolymer contains constituent units derived from propylene in an amount of 56 to 99% by mol and is in an amount of 30 to 94% by weight, and
    (C) a 1-butene-based polymer which is selected from the group consisting of a 1-butene homopolymer; a copolymer of 1-butene and an α-olefin of 2 to 20 carbon atoms excluding 1-butene (C-1), wherein the copolymer (C-1) contains constituent units derived from 1-butene in an amount of 60 to 99% by mol; and a copolymer of 1-butene, propylene and at least one α-olefin (C-2), wherein the at least one α-olefin is an arbitrary component and is selected from ethylene and α-olefin of 5 to 20 carbon atoms, and wherein the copolymer (C-2) contains constituent units derived from 1-butene in an amount of 16 to 40% by mol, and the total amount of constituent units derived from propylene and constituent units derived from the at least one α-olefin is in an amount of 60 to 84% by mol, with the proviso that when the total amount of constituent units derived from 1-butene, constituent units derived from propylene and constituent units derived from the at least one α-olefin is 100% by mol, and the amount of the constituent units derived from the at least one α-olefin is in a range of 0 to 5% by mol based on 100% by mol of the total amount of the constituent units derived from 1-butene, propylene and the at least one α-olefin; wherein the melting point of the 1-butene-based polymer, as measured by a differential scanning calorimeter (DSC), is in a range of 65 to 135° C., and wherein the 1-butene-based polymer is in an amount of 5 to 60% by weight, and
    wherein the total amount of said components (A) to (C) is 100% by weight.

2. The thermoplastic resin composition (X) as claimed in claim 1, wherein when the total amount of constituent units derived from 1-butene and constituent units derived from the α-olefin of 2 to 20 carbon atoms excluding 1-butene in the 1-butene/α-olefin copolymers (C-1) and (C-2) is 100% by mol, the total amount of constituent units derived from 1-butene and constituent units derived from propylene in the 1-butene/α-olefin copolymers (C-1) and (C-2) is not less than 80% by mol though the amount of constituent units derived from propylene may be 0% by mol.

3. The thermoplastic resin composition (X) as claimed in claim 1, further comprising a tackifying component (D) in an amount of more than 0 part by weight but not more than 100 parts by weight based on 100 parts by weight of the total amount of the components (A) to (C).

4. An adhesive comprising the thermoplastic resin composition (X) of claim 1.

5. A multilayer laminate obtained by laminating a layer comprising the thermoplastic resin composition (X) of claim 1 on one surface of a substrate.

6. The multilayer laminate as claimed in claim 5, which is a laminate for surface protection.

7. An article having a composition (X) layer, which is obtained by forming a layer comprising the thermoplastic resin composition (X) of claim 1 on at least a part of a surface of an article.

8. An article having a composition (X) layer, which is obtained by allowing the layer comprising the thermoplastic resin composition (X) of the multilayer laminate of claim 5 to adhere to at least a part of a surface of an article.

9. A method for protecting an article surface, comprising allowing a layer comprising the thermoplastic resin composition (X) of claim 1 to adhere to at least a part of a surface of an article.

10. A method for protecting an article surface, comprising allowing the multilayer laminate of claim 5 to adhere to at least a part of a surface of an article.

* * * * *